(12) United States Patent
Aoki et al.

(10) Patent No.: US 6,847,755 B2
(45) Date of Patent: Jan. 25, 2005

(54) OPTICAL CROSS CONNECTION SWITCH USING VOLTAGE-CONTROLLED INTERFEROMETRIC OPTICAL SWITCHING ELEMENTS

(75) Inventors: Katsuhiro Aoki, Tsuchiura (JP); Munenori Oizumi, Tsuchiura (JP); Susumu Kato, Tsukuba (JP); Yukio Fukuda, Tokai (JP)

(73) Assignee: Texas Instruments Incorporated, Dallas, TX (US)

( * ) Notice: Subject to any disclaimer, the term of this patent is extended or adjusted under 35 U.S.C. 154(b) by 85 days.

(21) Appl. No.: 10/300,114

(22) Filed: Nov. 20, 2002

(65) Prior Publication Data

US 2003/0152314 A1 Aug. 14, 2003

Related U.S. Application Data

(60) Provisional application No. 60/331,796, filed on Nov. 20, 2001.

(51) Int. Cl.⁷ .................................................. G02B 6/26
(52) U.S. Cl. ............................... 385/18; 385/16; 385/17
(58) Field of Search ...................... 385/16–24, 130–132, 385/141–145; 313/461, 506; 372/92

(56) References Cited

U.S. PATENT DOCUMENTS 6,614,161 B1 * 9/2003 Jacobsen et al. ............ 313/461
2004/0076367 A1 * 4/2004 Eom et al. ..................... 385/18

* cited by examiner

*Primary Examiner*—Phan T. H. Palmer
(74) *Attorney, Agent, or Firm*—Charles A. Brill; Wade James Brady, III; Frederick J. Telecky, Jr.

(57) ABSTRACT

An optical switch comprising an array of voltage-controlled interferometric switching elements. Different configurations and modes of operation are possible, but in each configuration the elements are arranged relative to the input and output fibers, such that a beam of light is incident or outgoing at an angle of 45 degrees to the surface of a corresponding element. This permits each element to be electronically controlled to either transmit or reflect light, such that the output beam exits the switch either parallel to or perpendicular to the input beam.

27 Claims, 2 Drawing Sheets

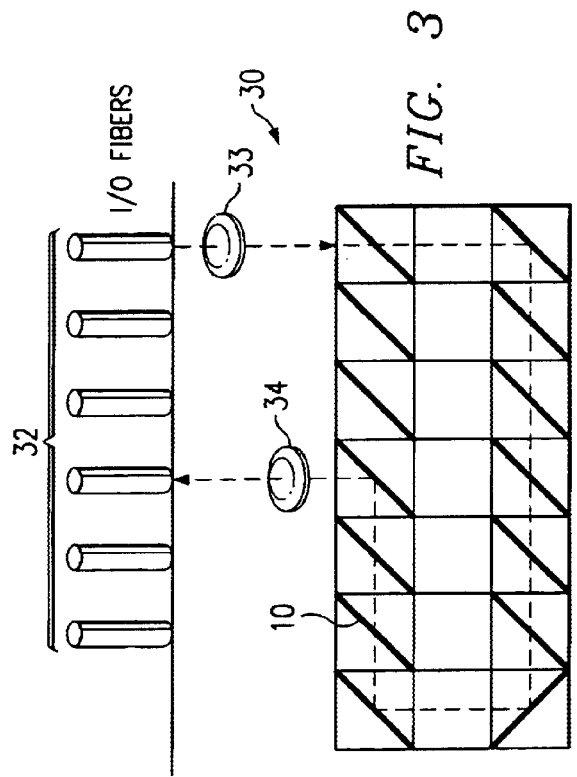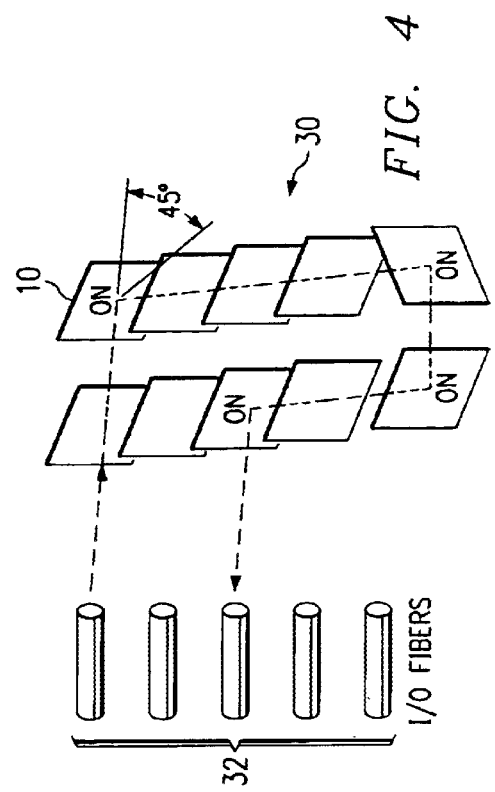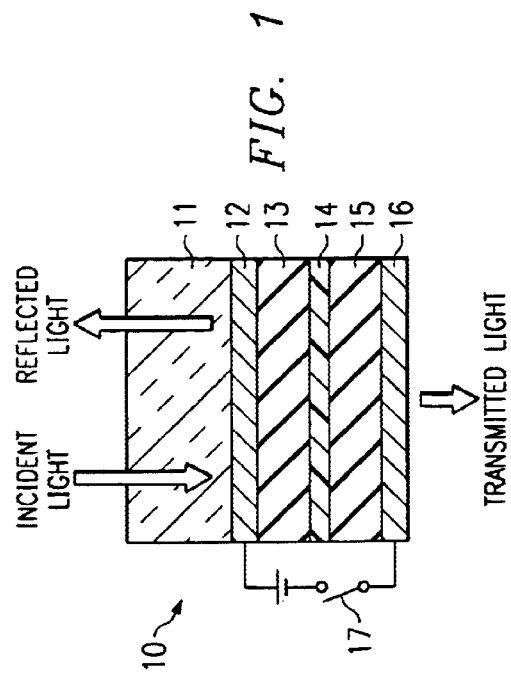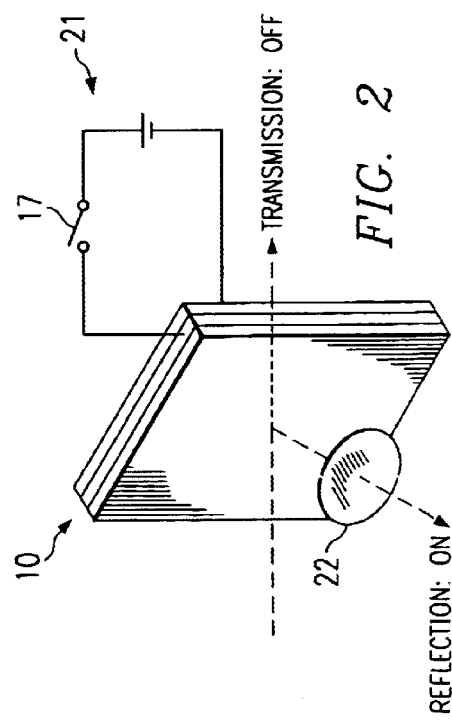

US 6,847,755 B2

OPTICAL CROSS CONNECTION SWITCH USING VOLTAGE-CONTROLLED INTERFEROMETRIC OPTICAL SWITCHING ELEMENTS

This application claims benefit of 60/331,796 filed Nov. 20, 2001.

TECHNICAL FIELD OF THE INVENTION

This invention relates to optical communications, and more particularly to an optical cross-connection device using micro-mirror elements.

BACKGROUND OF THE INVENTION

Global communications traffic in the form of voice, data, and video has grown tremendously in the past decade. To meet demand, communications bandwidth capacity and geographic coverage have been substantially expanded. Optical signals sent over optical fiber have been a key factor in enabling these advances.

A growing number of communications carriers are deploying optical switches, that is, switches that steer light pulses among different fiber spans without converting them into electrical signals at any point. The advantages of all-optical switching are significant. Optical switches promise to relieve bottlenecks, reduce costs, and provide good scalability.

Researchers are at work on various technologies for optical switching. These include the use of tiny micro-mirrors, liquid crystals, bubbles, holograms, and thermo- and acousto-optics. It may be that different of these technologies are suitable for different applications. For example, some switching fabrics may be better for large scale applications such as optical cross connects, whereas other technologies may be more appropriate for optical add-drop multiplexers or gear used in metro as opposed to long haul networks.

SUMMARY OF THE INVENTION

One aspect of the invention is an optical switch for switching a beam of light from an input fiber to an output fiber, the input fibers being parallel to the output fibers. The switch comprises an array of voltage-controlled interferometric optical switching elements. The elements are arrayed such that the axis of each input fiber and each output fiber is incident on an element at an angle of substantially 45 degrees. The array has two rows of elements such that each input beam and each output beam have an associated pair of elements, one in each row. The array also has an additional pair of elements at one end operable to reflect an input beam from one direction across the second row to the opposite direction across the first row. The array's configuration permits the elements to be electronically operated such that the output beam is outgoing in a direction parallel to the path of the input beam.

An advantage of the invention is that it provides for an optical switch for numerous applications, such as for communications, laser displays, projection displays, hologram memory writers, switching between storage networking devices, DWDM signal separation, and others. Applications for optical communications routing are especially promising.

BRIEF DESCRIPTION OF THE DRAWINGS

FIG. 1 illustrates a typical voltage-controlled interferometric (VCI) optical switch.

FIG. 2 illustrates the operation of the switch of FIG. 1.

FIG. 3 is a top plan view of a first embodiment of a cross connection switch in accordance with the invention.

FIG. 4 is a perspective view of the switch of FIG. 3.

DETAILED DESCRIPTION OF THE INVENTION

Figure 5:
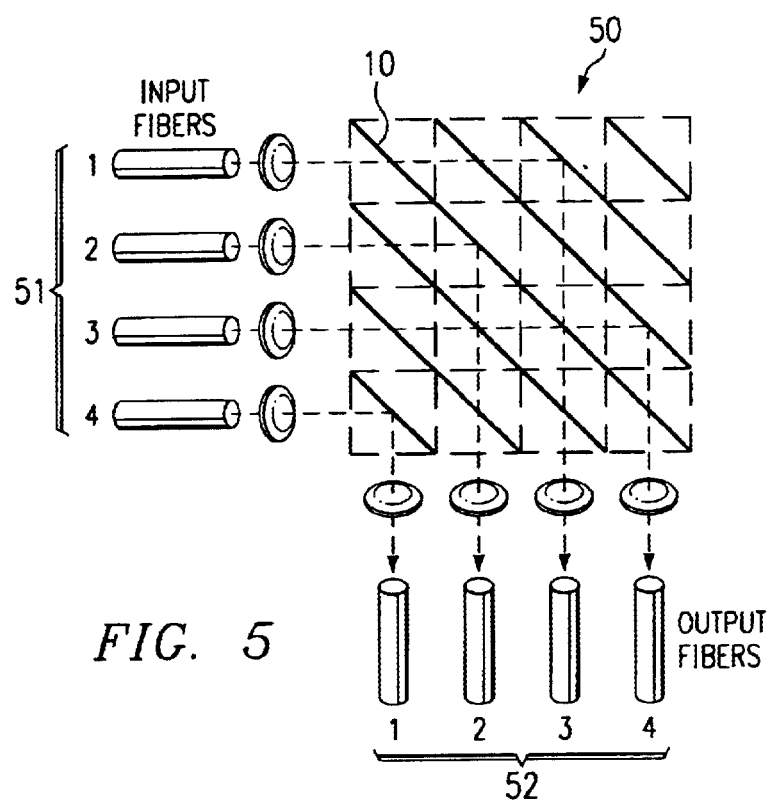
FIG. 5 is a top plan view of a second embodiment of the cross connection switch in accordance with the invention.

The following description is directed to various embodiments of an all-optical switch, suitable for dense wavelength division multiplexing (DWDM). DWDM is a fiber-optic transmission technique that employs light wavelengths to transmit data parallel-by-bit or serial-by-character.

Various embodiments of the invention are described, each being a high speed optical cross connection comprising a plurality of voltage-controlled interferomeric optical switches.

Voltage-Controlled Interferometric Optical Switches

FIG. 1 illustrates a voltage-controlled interferometric (VCI) optical switch 10. Switch 10 may be made using semiconductor fabrication techniques, and FIG. 1 is a cross sectional view of the layers of switch 10.

A first transparent electrode 12 is fabricated over a substrate 11. The next layer 13 is a dielectric mirror, which may itself be comprised of multiple layers. An electro-optic polymer layer 14 separates the first mirror layer 13 from a second dielectric mirror layer 15. The final layer is a second transparent electrode layer 16.

The electro-optic polymer layer 14 is made from a material whose optical reflective index varies in response to a change in electric field magnitude. As illustrated schematically by power source circuit 17, a voltage difference is applied to the two electrode layers 12 and 16.

FIG. 2 illustrates the operation of switch 10, including circuitry 21 for applying a voltage to operate switch 10. When an optical length of electro-optical polymer layer 14 is equal to one-half wavelength of incident light, switch 10 is transparent for that wavelength. Therefore, switch 10 operates in response to changing the applied voltage.

In FIG. 2, the incoming beam of light is incident on switch 10 at an angle. For purposes of this invention, it will be assumed that the angle of incidence is approximately 45 degrees. Because the axis of the incoming beam is not perpendicular to the face of switch 10, the switching property of switch 10 depends on polarization. Thus, a polarizer 22 is placed in the path of the beam of light reflected from switch 10. If the incident beam has been polarized, polarization at the output would not be necessary.

Optical Switching Arrays, Using VCI Elements

As explained above, a VCI optical switch 10 works as a simple optical switch, having either a reflection or transmission mode for a specific wavelength depending on an applied voltage. As explained below, an arrangement of an array of switches 10, with a proper tilting angle, can be used as an optical cross connection switch.

FIGS. 3 and 4 illustrate a first embodiment of a cross connection switch 30, comprising an array of VCI switching elements, such as switch 10. FIG. 3 is a top view, and FIG. 4 is a perspective view of switch 30.

The VCI elements 10 are arrayed with a tilting angle of 45 degrees. Input/output optical fibers 32, which transmit laser beams, are installed parallel to each other and such that their optical axes are adjusted to elements 10. Elements 10 are configured to operate as being transparent in an "off" state and reflective in an "on" state for a specific wavelength.

Switch 30 has two rows of elements 10. Each fiber 32 has an associated element 10 in the first row 30a and an associated element in the second row 30b.

In operation, an input beam enters switch 30 via an input fiber 32 and is transmitted through the corresponding element 10 in the first row 30a. The beam is then transmitted across the second row 30b by "off" elements 10, and back up to the first row 30a by two "on" end elements 10. The beam then traverses the first row 30a, through all appropriate "off" elements 10, until it reaches the element 10 corresponding to an output fiber 32. This element 10 is "on" so that the beam is reflected into the output fiber 32. In this manner, the signal from any input fiber 32 may be routed to an output fiber 32.

As indicated in FIG. 3, various optics 33 may be placed in the path of the incoming beam. These optics 33 may include various lenses and prisms, as well as a polarizer. As discussed above, polarization is used because of the angle of incidence of the face of switching elements 10 relative to the incoming beam. Similarly, optics 34 may be placed in the path of the outgoing beam, including a polarizer when the incoming beam is not polarized.

FIG. 4 further illustrates switch 30. Each switching element 10 is installed with an angle of 45 degrees against the optical axis of the input/output fibers 32. The output beam is transmitted in parallel with the input beam.

FIG. 5 illustrates a second embodiment of the invention, a cross connection switch 50 having the beam paths in a perpendicular configuration. Switch 50 has as many rows as output fibers 52. In the example of FIG. 5, there are four output fibers 52 and thus four rows of switch 50. An input beam enters switch 50 and is transmitted to the row corresponding to the desired output fiber 52. It is then reflected at a right angle toward the output fiber 52 and transmitted by intervening elements 10 so that it may enter the output fiber 52. In this manner, input beams are transmitted perpendicularly towards output fibers 52.

Figure 6:
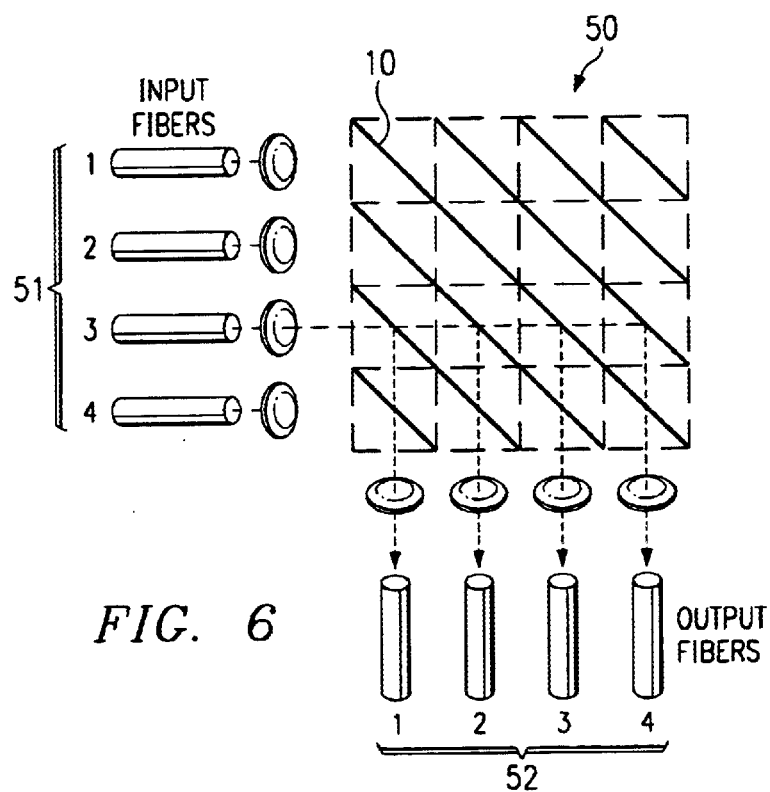
FIG. 6 illustrates how the switch of FIG. 5 may be operated in a one-to-many mode.

FIG. 6 illustrates how switch 50 may be operated in a one-to-many mode. By adjusting the applied voltage between the "on" state and the "oil" state, the beam can be split. Each element 10 in the path of the input beam that corresponds to a desired output fiber 52 is adjusted to this "mid-level" state so as to both transmit and reflect the signal.

Other Embodiments

Although the present invention has been described in detail, it should be understood that various changes, substitutions, and alterations can be made hereto without departing from the spirit and scope of the invention as defined by the appended claims.

What is claimed is:

1. An optical switch for switching a beam of light from an input fiber to an output fiber, the input fibers being parallel to the output fibers, the switch comprising:
   an array of voltage-controlled interferometric optical switching elements; and
   wherein the elements are arranged such that the axis of each input fiber and each output fiber is incident on an element at an angle of substantially 45 degrees.

2. The optical switch of claim 1, wherein the array has two rows of elements such that each input beam and each output beam have an associated pair of elements, one in each row; and
   wherein the array has an additional pair of elements at one end operable to reflect an input beam entering from one direction across the second row to the opposite direction across the first row.

3. The optical switch of claim 2, wherein at least one of the input beams shares a pair of elements with an output beam.

4. The optical switch of claim 1, wherein each interferometric optical switching element has two dielectric mirrors separated by an electro-optic polymer.

5. The optical switch of claim 4, wherein the dielectric mirrors and the polymer are between two transparent electrode layers.

6. The optical switch of claim 1, further comprising a polarizer in the path of the beam in front of the switch.

7. A method of switching a beam of light from an input fiber to an output fiber, the input fibers being parallel to the output fibers, comprising the steps of:
   arranging an array of voltage-controlled interferometric optical switching elements, each element having an off state that transmits light and an on state that reflects light; and
   the arranging being performed such that the axis of each input fiber and of each output fiber is incident on an element at an angle of substantially 45 degrees.

8. The method of claim 7, wherein the array having two rows of elements such that each input beam and each output beam have an associated pair of elements, one in each row, and the array further having an end pair of elements that do not correspond to an input fiber or output fiber, and further comprising the following steps:
   setting to an off state, the element of the first row corresponding the input fiber,
   setting to an on state, the element in the second row corresponding the input fiber;
   setting to an off state, all elements in the second row between the element corresponding to the input fiber and the end pair of elements;
   setting to an on state, the end pair of elements such that the end pair is operable to reflect an input beam from one direction across the second row to the opposite direction across the first row;
   setting to an off state, all elements in the first row between the end elements and the element corresponding to a desired output fiber; and
   setting to an on state, the element corresponding to the desired output fiber.

9. The method of claim 8, wherein at least one of the input beams shares a pair of elements with an output beam.

10. The method of claim 7, wherein the interferometric optical switch has two dielectric mirrors separated by an electro-optic polymer.

11. The method of claim 10, wherein the dielectric mirrors and the polymer are between two transparent electrode layers.

12. The method of claim 7, further comprising the step of polarizing the beam before it reaches any switching element or after it is reflected from the final switching element.

13. An optical switch for switching a beam of light from an input fiber to at least one output fiber, the input fibers being perpendicular to the output fibers, the switch comprising:

an array of voltage-controlled interferometric optical switching elements;

wherein the elements are arranged such that the axes of each input fiber and each output fiber is incident on an element at an angle of substantially 45 degrees; and wherein the array has as many rows of elements as output fibers, and has as many columns of elements as input fibers.

14. The optical switch of claim 13, wherein at least one of the input beams shares a pair of elements with an output beam.

15. The optical switch of claim 13, wherein the interferometric optical switch has two dielectric mirrors separated by an electro-optic polymer.

16. The optical switch of claim 15, wherein the dielectric mirrors and the polymer are between two transparent electrode layers.

17. The optical switch of claim 13, further comprising a polarizer in the path of the beam in front of the switch.

18. A method of switching a beam of light from an input fiber to an output fiber, the input fibers being perpendicular to the output fibers, comprising the steps of:

arranging an array of voltage-controlled interferometric optical switching elements, each element having an off state that transmits light and an on state that reflects light; and the arranging being performed such that the axis of each input fiber and of each output fiber is incident on an element at an angle of substantially 45 degrees, the array having as many rows of elements as output fibers, and has as many columns of elements as input fibers.

19. The method of claim 18, further comprising the steps of:

setting to an off state, in an input column that corresponds to the input fiber, all elements between the input fiber and the row corresponding to the output fiber;

setting to an on state, the element in the input column in the row corresponding the output fiber; and setting to an off state all elements between the element in the input column corresponding to the output fiber and the output fiber.

20. The method of claim 19, wherein at least one of the input beams shares a pair of elements with an output beam.

21. The method of claim 18, wherein the interferometric optical switch has two dielectric mirrors separated by a electro-optic polymer.

22. The method of claim 21, wherein the dielectric mirrors and the polymer are between two transparent electrode layers.

23. The method of claim 18, further comprising the step of polarizing the beam before it reaches any switching element or after it is reflected from the final switching element.

24. A method of switching a beam of light from an input fiber to multiple output fibers, the input fibers being perpendicular to the output fibers, comprising the steps of:

arranging an array of voltage-controlled interferometric optical switching elements, each element having an off state that transmits light, an on state that reflects light, and a middle state that both transmits and reflects light;

the arranging being performed such that the axis of each input fiber and of each output fiber is incident on an element at an angle of substantially 45 degrees, the array having as many rows of elements as output fibers, and has as many columns of elements as input fibers;

setting to an off state, in an input column that corresponds to the input fiber, elements that do not correspond to a desired output fiber;

setting to the middle state, elements in the input column that correspond to a desired output fiber; and setting to an off state, elements between the input column and the output fibers, in rows that correspond to the desired output fibers.

25. A voltage controlled interferometric switch element, comprising:

a quartz substrate;

a first transparent electrode fabricated over the substrate;

a first dielectric mirror fabricated over the first transparent electrode;

a polymer layer fabricated over the first dielectric mirror, the polymer layer being made from a material whose optical reflective index varies in response to change in surrounding electric field magnitude;

a second dielectric mirror fabricated over the polymer layer; and a second transparent electrode fabricated over the second dielectric mirror.

26. The switch element of claim 25, where the elements of the mirror are fabricated using semiconductor fabrication techniques.

27. The switch element of claim 25, wherein the first dielectric mirror and the second dielectric mirror have multiple layers.

* * * * *